United States Patent [19]

Fukumoto et al.

[11] Patent Number: 4,540,040

[45] Date of Patent: Sep. 10, 1985

[54] AIR TEMPERATURE CONTROL SYSTEM FOR VEHICLES

[75] Inventors: Ryutaro Fukumoto; Shuji Oyagi; Yukio Yoshida; Ryosaku Akimoto, all of Nagoya, Japan

[73] Assignee: Mitsubishi Jukogyo Kabushiki Kaisha, Tokyo, Japan

[21] Appl. No.: 446,215

[22] Filed: Dec. 2, 1982

[30] Foreign Application Priority Data

Dec. 23, 1981 [JP] Japan ................. 56-208284

[51] Int. Cl.³ .............. F25B 1/00; F25B 29/00; B60H 3/00; B61D 27/00
[52] U.S. Cl. .......................... 165/12; 62/226; 62/229; 62/323.4; 62/243; 165/28; 165/30; 165/43
[58] Field of Search ........... 165/42, 43, 30, 14, 165/28; 62/243, 244, 229, 223.4, 226; 237/2 A, 5

[56] References Cited

U.S. PATENT DOCUMENTS

| | | | |
|---|---|---|---|
| 4,337,818 | 7/1982 | Franz | 165/43 X |
| 4,340,113 | 7/1982 | Iwata et al. | 165/43 X |
| 4,356,705 | 11/1982 | Sutoh et al. | 62/243 X |
| 4,358,936 | 11/1982 | Ito et al. | 165/43 X |
| 4,365,663 | 12/1982 | Inoue et al. | 165/43 X |
| 4,383,574 | 5/1983 | Yoshioka | 165/43 |
| 4,408,278 | 10/1983 | Saito et al. | 165/42 X |
| 4,416,324 | 11/1983 | Sutoh et al. | 165/43 X |
| 4,476,919 | 10/1984 | Akimoto et al. | 165/30 |

FOREIGN PATENT DOCUMENTS

| | | | |
|---|---|---|---|
| 70724 | 5/1982 | Japan | 62/243 |

*Primary Examiner*—William R. Cline
*Assistant Examiner*—John K. Ford
*Attorney, Agent, or Firm*—Wenderoth, Lind & Ponack

[57] ABSTRACT

An air cooling temperature control system for use in vehicles including a cooler having a compressor, a heater having an air-mix damper and a room air temperature regulator, in which feedback control is effected so that a room air temperature may coincide with a preset temperature value. The output of the heater is regulated to respond to sudden changes in the room air temperature by controlling the opening of the air-mix damper. The duty cycle of the compressor is regulated by a controller so as to respond to gradual changes in room air temperature while the output of the heater is at a low level and to incrementally decrease the duty cycle of the compressor when the output of the heater is above the low level, thereby driving the output of the heater down so as to minimize the counteracting effects of concurrent heating and cooling, so that the desired room air temperature is maintained with minimal energy.

10 Claims, 9 Drawing Figures

4,540,040

AIR TEMPERATURE CONTROL SYSTEM FOR VEHICLES

BACKGROUND OF THE INVENTION

1. Field of the Invention

The present invention relates to an air temperature control system for use in vehicles such as private cars, trucks and buses.

2. Description of the Prior Art.

As shown in FIG. 1, an air temperature control system for use in motor vehicles in the prior art, which is generally designated by reference numeral 1, comprises a fan 2, an evaporator 3, a room heater 4 and the like. The evaporator 3 is cooled by operation of an expansion valve 5, a condensor 6 and a compressor 7. The compressor 7 is connected via an electromagnetic clutch 8 to an engine 9 for driving a vehicle. Cooled air leaving evaporator 3 is directed toward room heater 4 which is provided with heat by coolant water leaving the engine 9. Room heater 4 is provided with an air-max damper 10, the angle of which may be adjusted to divert a desired portion of the cooled air through the heater prior to being directed into the passenger compartment (room) of the vehicle, in order to regulate the room air temperature.

In such an apparatus, due to the fact that the air temperature at the outlet of the evaporator 3 is controlled to be held constant, energy loss through reheating a portion of the cooled air is potentially very large. In an improved system which takes energy saving into consideration, the relation between the temperature of the air at the outlet of evaporator 3 and the position of the air-mix damper 10 is controlled as illustrated in the diagram provided in FIG. 2. Such control is provided by a potentiometer 12 for detecting the position of the air-mix damper 10 as normally coupled to an actuator 11 and a thermistor 13 for detecting the temperature of the air at the outlet of evaporator 3. Moreover, compressor 7 is controlled via electromagnetic clutch 8 to be turned ON and OFF so that the air temperature at the outlet of evaporator varies linearly in proportion to the variation of the position of the air-mix damper 10. However, even such an improved system has a shortcoming that it is not as energy efficient as it might be and its temperature regulation is insufficient. The present invention improves upon the temperature regulation and energy efficiency of the prior art systems.

OBJECT AND SUMMARY OF THE INVENTION

It is therefore one object of the present invention to provide an air temperature control system for use in vehicles, which can achieve much improved temperature regulation with the compressor operating at a minimum duty cycle.

According to one feature of the present invention, there is provided an air temperature control system for use in vehicles, including a cooler, a heater and a room air temperature regulator in which feedback control is effected so that the room air temperature coincides with a preset temperature, the system including a controller for regulating the duty cycle of the cooler so that the room air temperature regulator may be positioned at a "MAX COOL" POSITION or in an adjacent range or "MAX COOL ZONE" as long as possible.

BRIEF DESCRIPTION OF THE DRAWINGS

The above-mentioned and other features and objects in the present invention will become more apparent by reference to the following description of preferred embodiments of the invention taken with the accompanying drawings in which.

DETAILED DESCRIPTION OF THE PREFERRED EMBODIMENTS

Figure 1:
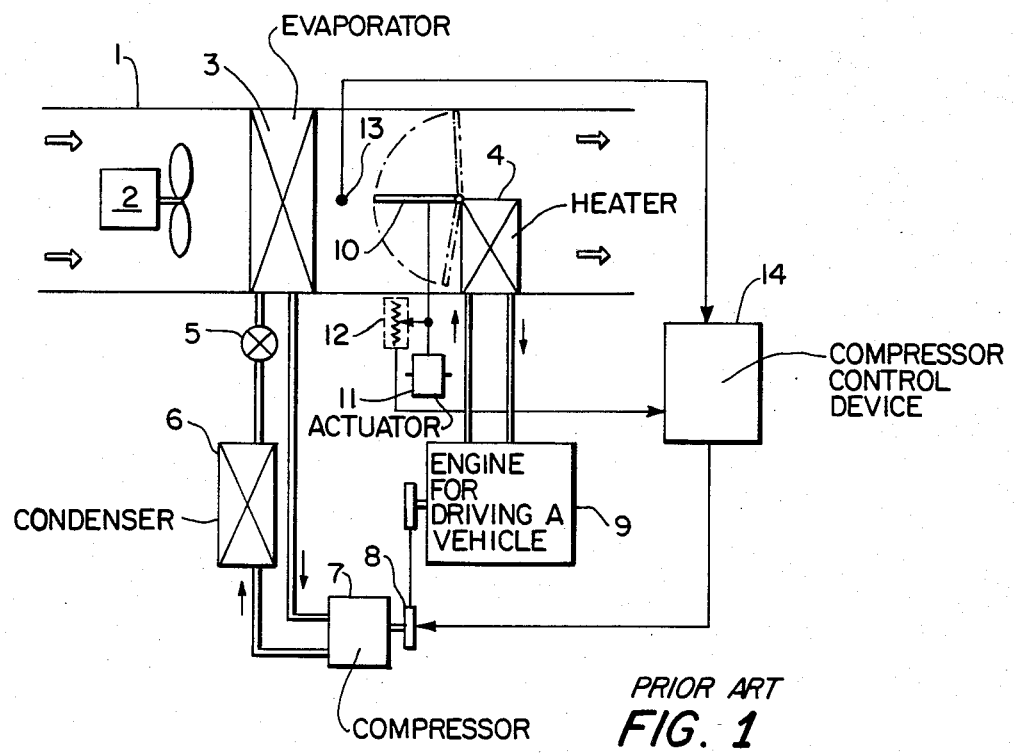
FIG. 1 is a block diagram of a prior art air temperature control system for use in vehicles.
Figure 2:
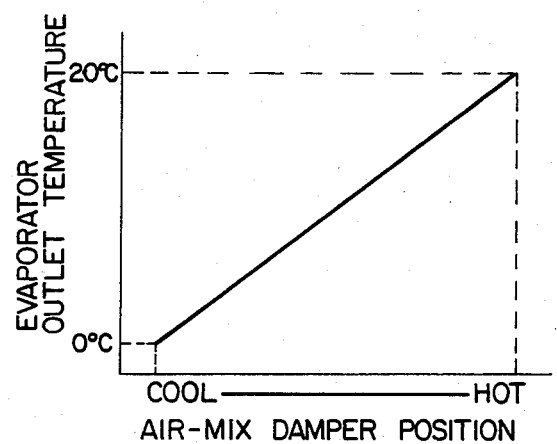
FIG. 2 is a diagram showing the relationship between the air-mix damper position and the temperature of the air at the outlet of the evaporator for the prior art system shown in FIG. 1.
Figure 3:
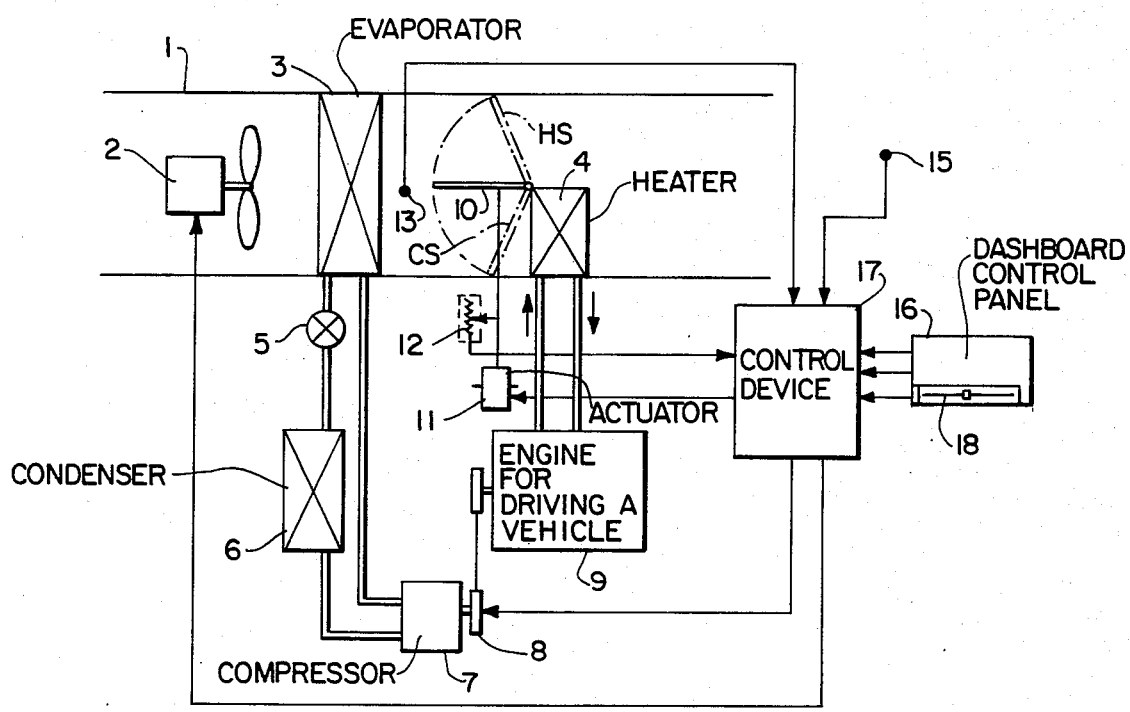
FIG. 3 is a block diagram of an air temperature control system for use in vehicles according to one preferred embodiment of the present invention.
Figure 9:
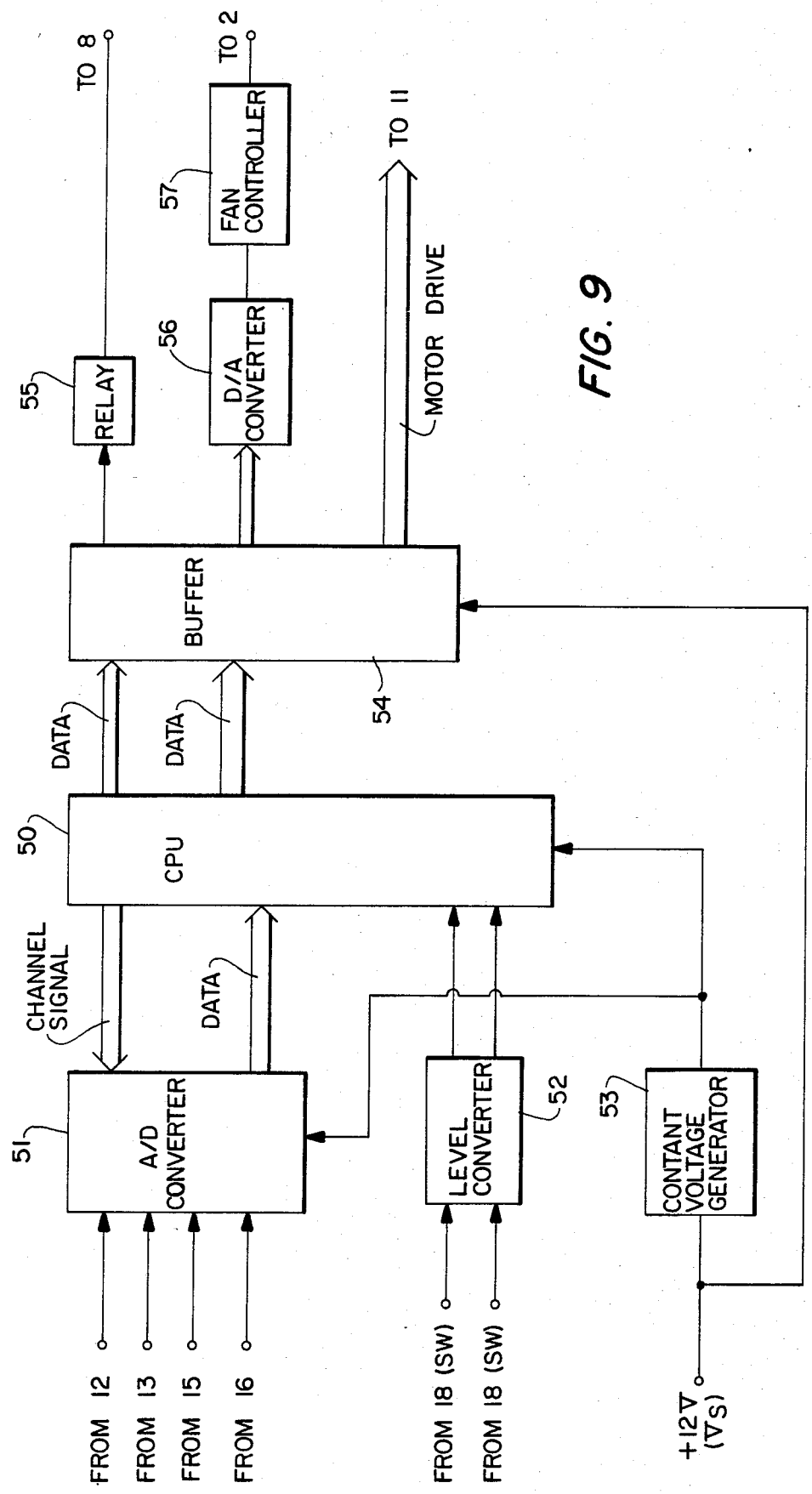
FIG. 9 is a block diagram of the control device of the invention.

Referring now to FIG. 3, which shows one preferred embodiment of the present invention, reference numeral 1 generally designates an air temperature control system for use in vehicles, which comprises a fan 2, an evaporator 3, and a heater 4. Evaporator 3 is cooled by an operation valve 5, a condensor 6, and a compressor 7. Compressor 7 is connected via an electromagnetic clutch 8 to an engine 9 for driving a vehicle, and coolant water for the engine 9, which is heated by the engine 9, is supplied to heater 4. Reference numeral 10 designates an air-mix damper which is driven by an actuator 11 and whose position is detected by a potentiometer 12. The temperature of the air at the outlet of evaporator 3 is detected by means of a thermistor 13, while the vehicle room air temperature is detected by means of a thermistor 15. The temperature information detected by thermistors 13 and 15, as well as the settings on a switch-input type temperature setter 18, are input to a control device 17. As illustrated in FIG. 9, control device 17 is principally composed of an input interface including an A/D converter 51 and a level converter 52, a micro-processor chip 50, and an output interface, including a buffer 54, relay 55, a D/A converter 56, and a fan controller 57. All of the elements 51–57 of the control device 17 are of conventional design. The microprocessor 50 is designed to carry out the control program for executing the flow of control shown in FIGS. 4–6.

Before providing a detailed explanation of the operation of the above-described embodiment, a summary of its operation and operating principles will be provided. In the illustrated air temperature control system, the room air temperature is controlled so as to become equal to a temperature value preset in temperature setter 18 located on the manual control panel of the vehicle. As shown in FIG. 3, the room air temperature is detected by thermistor 15. The detected temperature value is compared in the control device 17 with the preset temperature that has been initially set in temperature setter 18. A deviation DT between the two temperature values, as well as an integrated value of the deviation, are then calculated in control device 17. Based on these calculations, if there exists any deviation, control device 17 drives air-damper 10 via actuator 11 to regulate the proportion of the cool airflow from evaporator 3 which enters heater 4. Thus, the outlet air temperature of the air temperature control system is varied in order that the room air temperature approaches the preset temperature. In other words, feedback is continuously used to control the outlet temperature of the air temperature control system.

Here, attention should be paid to the movement of air-mix damper 10 associated with the feedback action. If any external disturbance to the room air temperature of the vehicle, such as variations in the amount of sunshine, outdoor temperature, or vehicle speed, should occur, the load on the air temperature control system varies and accordingly, the room air temperature changes. Hence, air-mix damper 10 is moved so as to adjust the rate of heating the cooled air and thereby regulate the room air temperature, in response to temperature change. From a different viewpoint, it is seen that the movement of air-damper 10 is a sensitive reflection of the air conditioning load per se which changes from moment to moment. For instance, assuming the air-mix damper 10 is in an initially intermediate position as shown in solid line in FIG. 3, if sunshine becomes stronger, then air-mix damper 10 moves downward to the cooler side CS, indicating that relative cooling is necessary. On the other hand, if sunshine suddenly becomes weaker, then air-damper 10 moves to the heater side HS of the air-mix damper 10.

Examining the movements of air-mix damper 10 from the standpoint of cooling capability, when air-mix damper 10 is at its lowest point shown in FIG. 3 ("MAX COOL POSITION", MCP), maximum cooling occurs. When air-mix damper 10 has moved to this position, the capacity of the device for cooling additional load is clearly changing quite limited. On the other hand, when the position of the air-mix damper 10 is not at the "MAX COOL POSITION" MCP, it will be seen that there still remains additional cooling capacity. Now, it is clearly undesirable from the viewpoint of power saving that despite a surplus of cooling capacity, compressor 7 is always driven continuously, and temperature regulation is effected by reheating air with heater 4. Therefore, in accordance with the invention, compressor 7 is subjected to an ON-OFF operation and an operation matched with the load is effected by varying the duty cycle of compressor 7 so that power saving may be achieved. This improved air temperature control system is the system for use in vehicles according to the present invention.

If the duty cycle of compressor 7 is lowered when the position of air-mix damper 10 is not at the "MAX COOL POSITION", then since the OFF time is prolonged, the cooling capacity of the system is caused to approach its limit with respect to operation of air-mix damper 10, by moving to the cooler side CS. In other words, when cooling is necessary, if the operation of compressor 7 is regulated so that air-mix damper 10 can always be moved to the cooler side CS, then it becomes possible to operate the compressor 7 at a generally low duty cycle, thereby saving power.

In addition, where air-mix damper 10 is at the "MAX COOL POSITION" and cooling is required, if the room air temperature is lowered and becomes lower than a preset temperature value, then control device 17 lowers the duty cycle of compressor 7. As a result, the room air temperature is raised, and if it becomes higher than the preset temperature value, the control device 17 raises the duty cycle of compressor 7. By effecting such a mode of control, the duty cycle of compressor 7 is held at the minimum duty cycle necessary to maintain the room air temperature at the preset temperature value, and thereby power saving can be achieved. Thus, if the system is operated so that the air-mix damper 10 is maintained at the "MAX COOL POSITION" as long as possible to forcibly lower the duty cycle of compressor 7, during the cooler seasons of the year when the outdoor temperature is low, and especially during the winter season, the compressor 7 would be scarcely operated and hence the power saving effect of the invention would be most evident.

Figure 7:
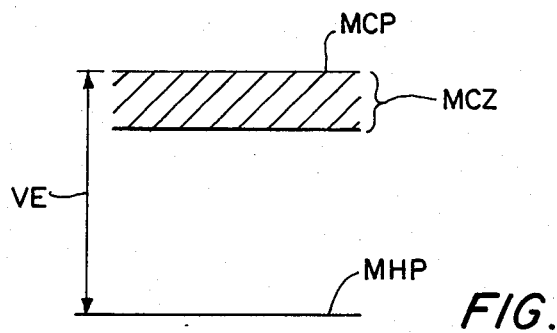
FIG. 7 is a graphical representation of a "MAX COOL ZONE" for the embodiments shown in FIGS. 3–6.

Furthermore, as shown in FIG. 7 in accordance with the preferred embodiments, a "MAX COOL ZONE" can be preset in the proximity of the "MAX COOL POSITION" in the moveable range VE of air-mix damper 10, and the duty cycle of compressor 7 is regulated so that air-mix damper 10 can move into the "MAX COOL ZONE". Varying the duty cycle of compressor 7 is relatively slow, having a response time constant of 1-3 minutes (the time period of a single ON and OFF operation of the compressor) and is employed to respond to slow variations of the room air temperature. Upon high-speed variation of the room air temperature, typically due to external disturbances, the high-speed response of air-mix damper 10 (with a time constant of a few seconds) is employed. Here it is to be noted that the "MAX COOL ZONE" is limited to at most 20% of the entire moveable range VE of the air-mix damper 10. In FIG. 7, reference symbol MHP represents the "MAX HOT POSITION" of air-mix damper 10.

The above-described air temperature control system for use in vehicles also has excellent response characteristics for maintaining a steady room air temperature despite its power saving nature. It is to be noted that if the range of the "MAX COOL ZONE" is minimized, the power saving effect becomes maximum. In addition, in an embodiment of the present invention which provides for humidity reduction irrespective of the temperature, the duty cycle of compressor 7 in reducing humidity is minimized. Compared to the heretofore known system for lowering humidity while maintaining the duty cycle of the compressor at its maximum, the power saving of the present invention is substantial. Furthermore, in the system according to the present invention, power saving control is effected by means of a minimum number of component parts of the air temperature control system and does not require the use of any special sensors (for example, an outdoor temperature sensor or a sunshine sensor). As a result, the system of the present invention is very economical.

Figure 4:
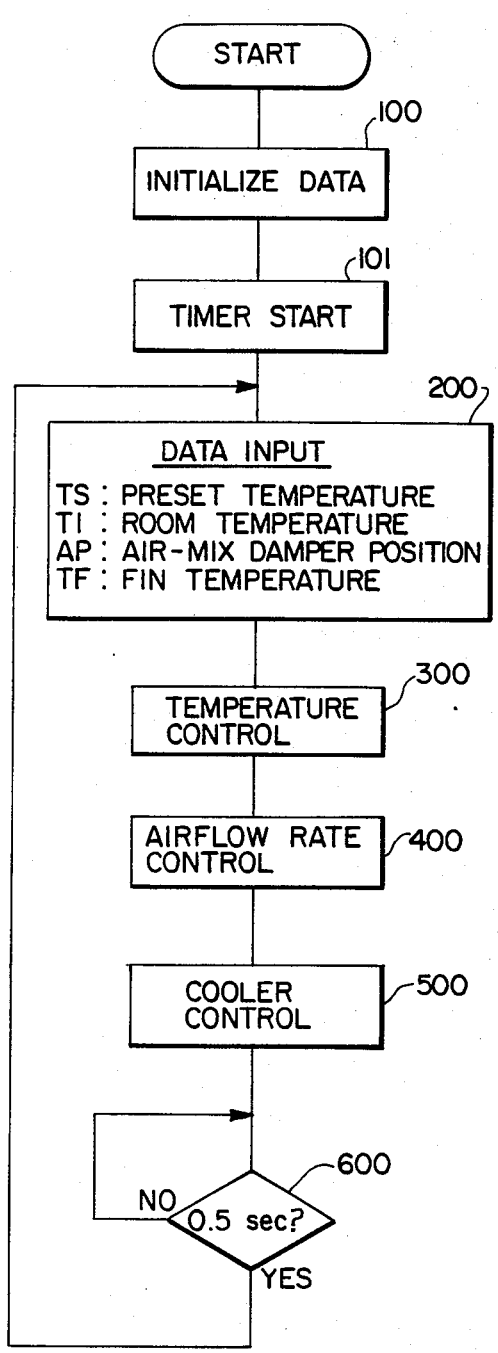
FIGS. 4–6 are flow diagrams showing modes of control operations in the embodiment shown in FIG. 3.

Now the operation of the air temperature control system according to the above-described embodiment will be described in greater detail. Operation of control device 17 in FIG. 3 is initiated in response to the switching on of a power supply. Control device 17 contains therein a microprocessor for executing a control algorithm as illustrated in FIG. 4. After the power supply has been switched on at step 100, data within a RAM (Random Access Memory) in the microprocessor are all cleared to "0". Next, at step 101, a timer contained in the microprocessor is started. At step 200 which follows, the room air temperature from thermistor 15, an evaporator outlet (evaporator fin) air temperature from the thermistor 13, the position of air-mix damper 10 from potentiometer 12, the preset temperature value, and an air conditioning switch signal or an air-drying (dehumidifier) switch signal from manual control panel 16 are input to control device 17. Subsequently, at step 300, calculations for air temperature control within a vehicle room are carried out on the basis of a proportional factor, an integral control factor and a derivative control factor, all based on the measured amount of deviation of the vehicle room air temperature from the preset temperature value, in order to control the actuator 11 which drives air-mix damper 10. Furthermore, at step 400, calculations are performed in order to control the fan 2 to thereby control the air-flow rate. Finally, at step 500, control for the cooler is carried out. The above-mentioned series of controls are executed in 0.5 second cycles with the aid of a cycle timer at step 600.

Figure 5:
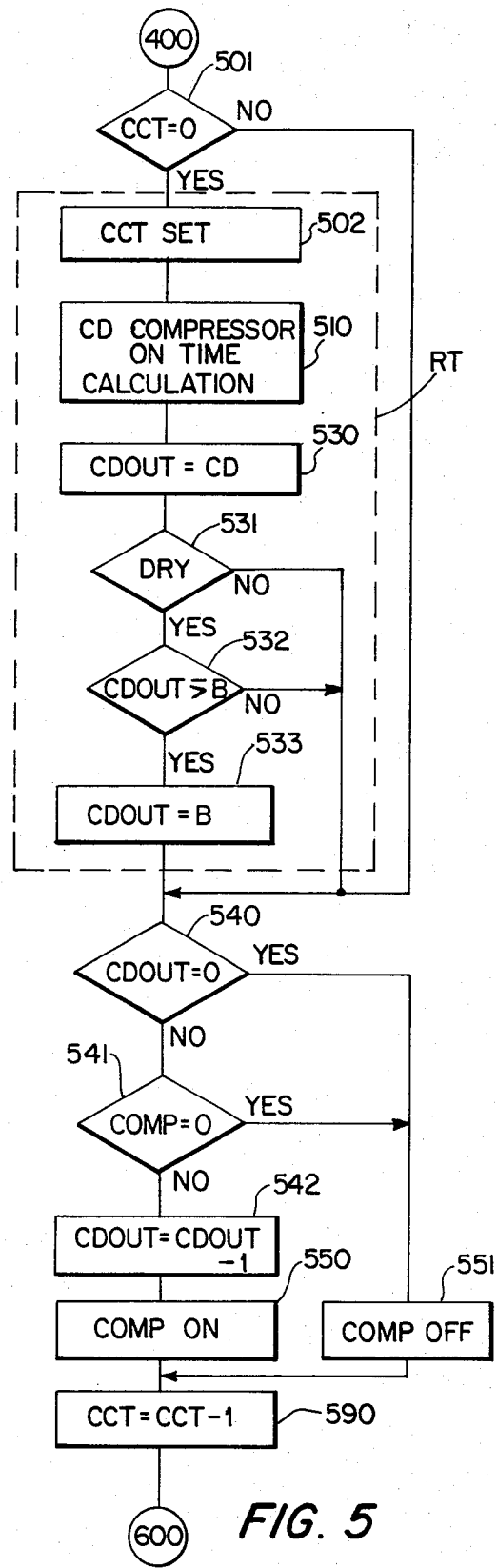

Now the operation of the control device 17 at step 500 will be explained in greater detail. A series of substeps for the control of the duty cycle of compressor 7 is illustrated in FIG. 5. With reference to this figure, at substep 501 it is determined whether a Cooler Control Time CCT held in a timer in control device 17 is at "0". The CCT specifies the remaining time (number of cycles) in an ON-OFF cycle period of compressor 7. Since CCT is set to "0" at step 100 as an initial condition, at substep 502 CCT is set equal to the desired cycle period. For example, the desired cycle period can be manually set or reset on panel 16 and then input to control device 17 as CCT at substep 502. As a cycle period of 1–3 minutes is appropriate and in the illustrated case the length of an individual cycle is 0.5 seconds, CCT can be set to 120–360 cycles as described above.

Figure 6:
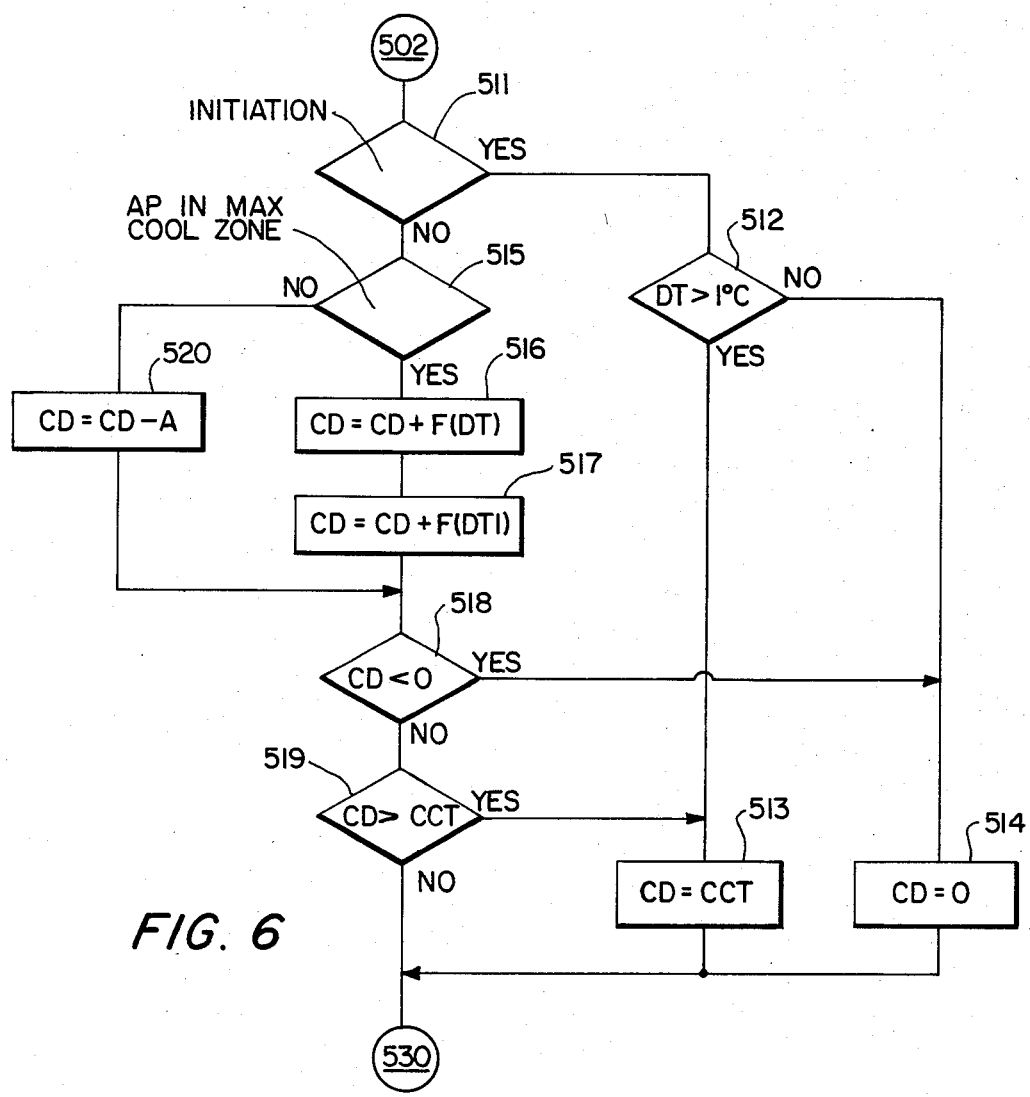

At the next substep 510, calculation of the Compressor Operation Time CD is executed according to a control algorithm shown in FIG. 6. More particularly, at substep 511 it is determined whether the cycle is an initial cycle (the first cycle after switching on the power supply), and if so, then at substep 512 it is determined if deviation DT is larger than 1° C. If DT>1° C. is determined, then at substep 513 CD is set equal to CCT, whereby compressor 7 will be maintained ON for the entire cycle period, whereas, if DT≦1° C. is determined then at substep 514 CD is set equal to 0, and the control advances to substep 530 (shown in FIG. 5). In the next and subsequent steps of the CD calculation shown in FIG. 6, the control advances from substep 511 to substep 515, and if the position AP of air-mix damper 10 is in the "MAX COOL ZONE" MCZ (including the "MAX COOL POSITION" MCP), the control advances to substep 516 to increment the value of CD by F(DT), where the designation F(DT) represents a function which is proportional to the temperature deviation DT. Next, at substep 517 the value of time CD is again incremented by the value F(DTI), where the designation F(DTI) represents a function which is proportional to the variation of the room air temperature DTI that is defined by the difference between the room air temperature in the current cycle TI and the room air temperature in the immediately preceding cycle TI. It is to be noted that the functions F(DT) and F(DTI) both can be step-like functions. In addition, substep 517 can be omitted if desired. On the other hand, if the position AP of air-mix damper 10 is not in the "MAX COOL ZONE" MCZ or, in the limit of a very narrow MAX COOL ZONE, if the position AP is not the "MAX COOL POSITION" MCP, at substep 512 the value of time CD is reduced by an appropriate preselected positive value A.

The result of the above calculations is checked at substep 518, and if CD is negative, substep 514 is performed to set the value of CD to 0. If CD≧0, then the value of CD is further checked at substep 519 and if CD is greater than CCT, substep 513 is performed to set CD equal to CCT. These steps assure that the ON time CD of compressor 7 during each cycle period will be between 0 and CCT, which in the initial cycle, will be equal to the total length of the cycle period.

Subsequently, as shown in FIG. 5, substep 530 is performed to set the output timer value CDOUT for switching ON compressor 7, equal to CD. Substep 531 is then performed to determine whether a DRY signal is present. This DRY signal issues from a manual switch or an automatic humidity regulator or the like to indicate that the humidity is to be reduced. If a DRY signal is not present, the control advances to substep 540 with the value CDOUT of the output timer uneffected. If the DRY signal is present, substep 532 is performed to determine if CDOUT<B, where reference symbol B denotes an operation time of the compressor 7 at a minimum duty cycle for lowering the room humidity. Then, CDOUT is set equal to B in substep 533 and the control advances to substep 540. It is to be noted that in an embodiment of the invention in which a humidity reducing capability is not incorporated, the substeps 531–533 can be omitted.

Control device 17 also calculates a value COMP which can take on the values "0" and "1" and which is a flag for turning compressor 7 ON and OFF. COMP is assigned the value of "0" when any one or more of an air temperature control switch, a high voltage switch and a low voltage switch are OFF, and is assigned the value "1" only in the case where all the above-mentioned switches are ON. The values of CDOUT and COMP are respectively checked at substeps 540 and 541 and if either CDOUT=0 or COMP=0, power is cut off to electromagnetic clutch 8 (designated by the symbol COMP OFF) at substep 551, whereby compressor 7 is turned OFF.

When CDOUT≠0, and COMP≠0, substep 542 is performed to reduce CDOUT by 1. Then, at substep 550, the power is provided to the electromagnetic 8 (which condition is designated by the symbol COMP ON), whereby compressor 7 is driven. Next, at substep 590, the value of CCT is increased by one and the control advances to step 600. As a result, during a cycle period of CCT×0.5 seconds, compressor 7 is turned ON for CD×0.5 seconds and is turned OFF for (CCT−CD)×0.5 seconds. Thus, the duty cycle is equal to CD÷CCT. In FIG. 5, the routine RT framed by a dashed line is a routine for determining the duty cycle of compressor 7.

Accordingly, in the above-identified air temperature control system for use in vehicles, when the outdoor temperature is low and hence cooling is unnecessary, as during the winter and intermediate seasons, since air-mix damper 10 is not placed at the "MAX COOL POSITION" (or in the "MAX COOL ZONE"), the duty cycle of compressor 7 is lowered and normally compressor 7 is switched OFF. In addition, even during the intermediate and summer seasons, compressor 7 operates at a duty cycle that is adapted for the current load of cooling. As a result, energy loss due to reheating of cooled air by the heater 4 is minimal and the minimum necessary compressor duty cycle can be attained. Furthermore, for lowering humidity the compressor also operates at the minimum duty cycle necessary to perform that function. Thus, evaluating the compressor duty cycle over a period of a year, during the intermediate seasons and the winter season a great power saving is achieved, and even during the summer a substantial power saving is observable as compared to the air temperature control systems of the prior art. Moreover, in order to achieve the above-identified effects, no special sensors such as outdoor temperature sensors or sunshine sensors are needed, and thus the proposed system is a less expensive one.

Figure 8:
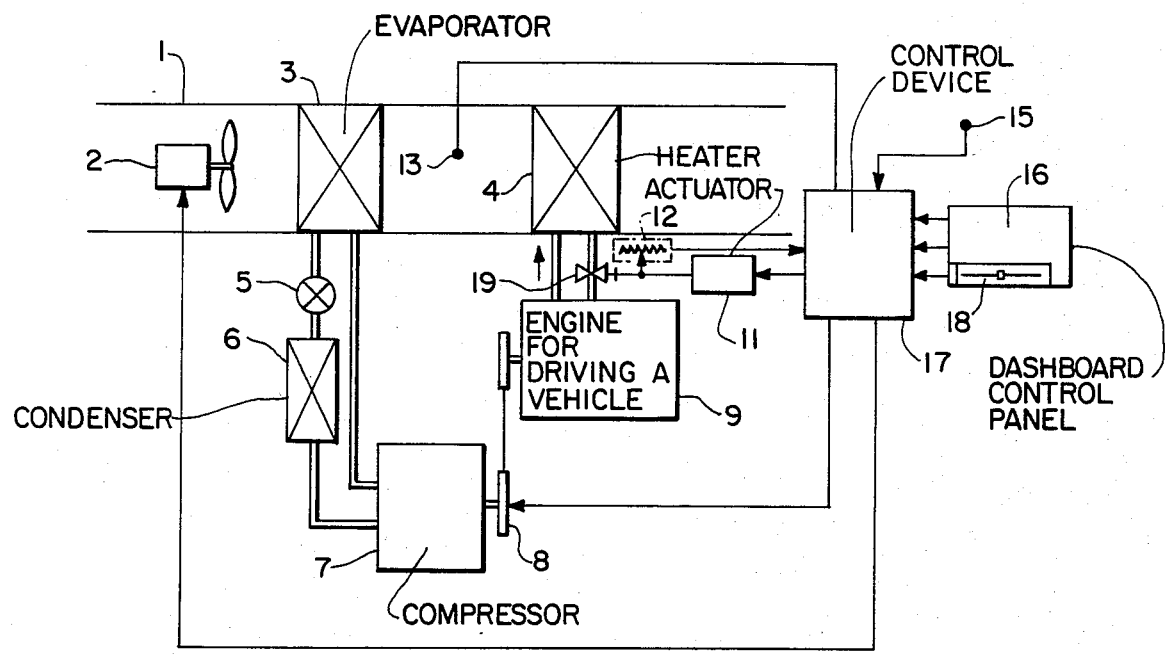
FIG. 8 is a block diagram of an air temperature control system for use in vehicles according to another preferred embodiment of the present invention.

FIG. 8 shows another preferred embodiment of the present invention, and in this illustrated structure, a hot water flow rate regulating valve 19 is employed in place of air-mix damper 10 in the above-described first embodiment.

In FIG. 8, reference 1 generally designates an air temperature control system for use in vehicles according to the present invention, numeral 2 designates a fan, numeral 3 designates an evaporator, numeral 5 designates an expansion valve, numeral 6 designates a condensor, numeral 7 designates a compressor, numeral 8 designates an electromagnetic clutch, numeral 9 designates an engine for driving a vehicle, numeral 11 designates an actuator, number 12 designates a potentiometer, a numeral 13 designates a thermistor for detecting the air temperature at the outlet of evaporator 3, numeral 15 designates a thermistor for detecting the vehicle room air temperature, numeral 16 designates a manual control panel, numeral 17 designates a control device, and numeral 18 designates a switch-input type temperature setter on panel 16.

Similarly to the above-described first embodiment of the invention, control device 17 is composed of an input interface, a microprocessor, an output interface and related elements. The microprocessor executes the control program illustrated in FIG. 4.

Now the operation of the above-identified modified embodiment will be explained. Control device contains a microprocessor adapted to execute the control program illustrated in FIG. 4. Upon switching on the power supply of the microprocessor at step 100, RAM data in the microprocessor are all cleared to "0". Next, at step 101 the timer contained in the microprocessor is started. At step 200 which follows, the vehicle room air temperature from thermistor 15, the evaporator outlet (evaporator fin) air temperature from thermistor 13, the position of hot water flow rate regulating valve 19 from potentiometer 12, and a preset temperature value, an air conditioning switch signal and a DRY switch signal from panel 16, are input to the control device 17. Subsequently, at step 300, calculations for room air temperature control are carried out on the basis of a proportional control factor, an integral control factor and a derivitive control factor, all functions of the measured amount of deviation of the vehicle room air temperature from the preset temperature value, in order to control the actuator 11 for driving the hot water flow rate regulating valve 19. The subsequent operation of the system, including control device 17, is identical to that of the above-identified first embodiment employing the air-mix damper 10.

Accordingly, in such a modified air temperature control system displacement of the hot water flow rate regulating valve 19 performs the role of the position of the air-mix damper 10, and thereby the duty cycle of the compressor 7 can be lowered according to the same operating principles as the first preferred embodiment.

As described in detail above, the invention is an air temperature control system for use in vehicles which includes a cooler, a heater, and means for regulating room air temperature. The invention further includes feedback control which is effected so that room air temperature may coincide with a preset temperature value, and which additionally includes means for regulating the ON/OFF operation of the cooler so that the means for regulating the room temperature can be positioned at a MAX COOL POSITION or in MAX COOL ZONE as long as possible. Accordingly, there is provided a much improved air temperature control system for use in vehicles which can achieve satisfactory temperature regulation while the compressor is operating at a minimum duty cycle.

Since the embodiments of the invention described above are set forth for illustrative purposes only and many variations from those embodiments can be made without departing from the scope of the invention, it is intended that all matter in the above description or shown in the accompanying drawings shall be interpreted as illustrative only and not as a limitation to the scope of the invention which is to be limited only by the claims.

What is claimed is:

1. An air temperature control system for regulating the air temperature in a room in a vehicle, comprising:
   a. means, defining a continuous path, for directing air along said path into said room;
   b. means, disposed in said path, for respectively cooling and not cooling said air in said path, in response to ON signals and OFF signals; said cooling means having a duty cycle defined by the proportion of time said cooling means is operating and not operating;
   c. means, disposed in said path, for adding heat to the air cooled in said cooling means;
   d. means for producing a difference signal indicative of the difference between the temperature of the air in the room and a preset temperature value; and
   e. feedback control means, responsive to said difference signal, for regulating the rate of adding heat by said adding heat means, and regulating the duty cycle of said cooling means, so as to continuously reduce the difference between the temperature of the room air and the preset temperature value;
   said feedback control means including:
   (1) means, responsive to said difference signal, for incrementally changing the heating rate of adding heat by said adding heat means;
   (2) means, responsive to said signal, for adjusting said duty cycle to reduce said temperature difference, when said heating rate is less than a predetermined low heating amount; and
   (3) heating rate decreasing means for incrementally decreasing said heating rate to below said predetermined low heating amount; said heating rate decreasing means including means for incrementally reducing said duty cycle when said heating rate is above said predetermined low heating amount so as to increase said temperature difference, thereby to cause said incrementally changing means to decrease said heating rate toward said predetermined low heating amount.

2. A system as in claim 1, wherein said duty cycle adjusting means comprises means for increasing said duty cycle by an amount which is a function of the magnitude of the difference between the preset temperature value and the room air temperature when the room air temperature exceeds the preset temperature value and said heating rate is less than said predetermined low heating amount.

3. A system as in claim 1, wherein said means for adjusting said duty cycle comprises means for increasing the duty cycle only when said heating rate is not greater than said predetermined low amount.

4. A system as in claim 1, wherein said means for incrementally reducing said duty cycle comprises means for reducing the duty cycle by a predetermined incremental value.

5. A system as in claim 2, wherein said duty cycle increasing means comprises means for increasing said duty cycle by an amount which is a function of a prior change in said temperature difference.

6. A system as in claim 2, wherein said function includes a function of a time integral of said magnitude of the difference between the preset temperature value and the room air temperature.

7. A system as in claim 1, wherein said system further comprises means for reducing the humidity in said room air, said humidity reducing means including means for issuing a DRY signal when the room air humidity is to be reduced, said feedback control means including means, responsive to said dry signal, for maintaining said duty cycle at at least a predetermined minimum value.

8. A system as in claim 1, wherein said heating means comprises a heater and said means for incrementally changing the heating rate of adding heat by said adding heat means comprises an air-mix damper for directing a portion of said cooled air into said heating means.

9. A system as in claim 1, wherein said air temperature control system additionally comprises an engine, said heating means including a heater, means for conducting cooling water from said engine to said heater, and means for regulating the flow of water between said engine, and said heater through said conducting means.

10. A system as in claim 1, wherein said cooling means includes a compressor, said feedback control means comprising a pulse width modulation system which includes said heating rate changing means, said duty cycle adjusting means and said heating rate decreasing means, said pulse width modulation system gradually and continuously varying the duty cycle of said compressor as a function of said temperature difference so as to compensate for gradual changes in the temperature of the room air, while driving said heating rate toward said predetermined low heating amount when said heating rate is above said predetermined low heating amount, and responding to sudden changes in the temperature of the room air by adjusting said heating rate.

* * * * *